(No Model.)
R. McFARLANE.
RECORDING SCALE.
No. 495,752.  Patented Apr. 18, 1893.
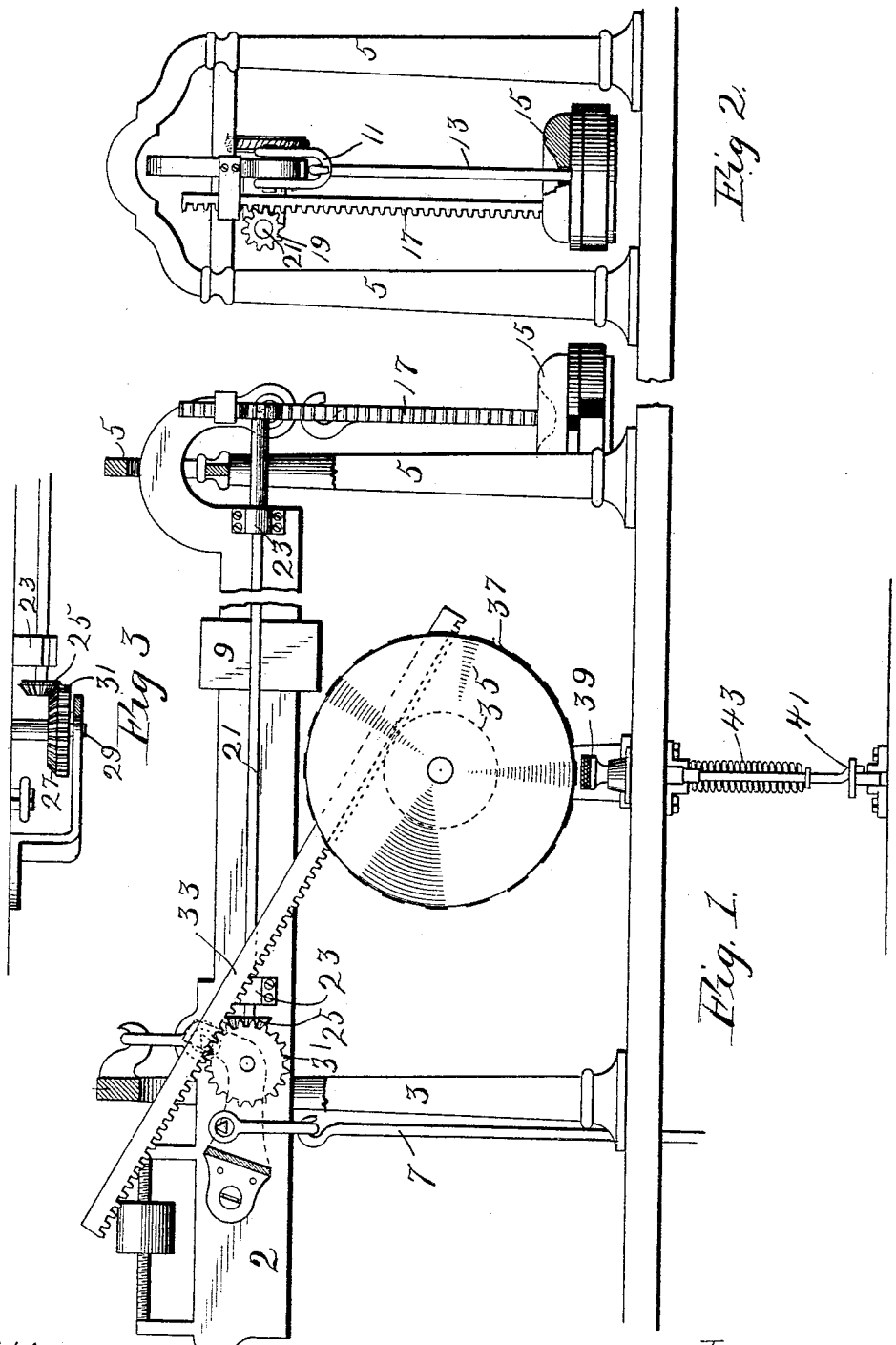
Witnesses.
G. E. Purple.
C. E. Van Dorn.
Inventor.
Robert McFarlane.
By Paul Sinnerman
His Atty's.

UNITED STATES PATENT OFFICE.

ROBERT McFARLANE, OF MINNEAPOLIS, MINNESOTA, ASSIGNOR OF ONE-HALF TO WALDO E. HOLMES, OF SAME PLACE.

RECORDING-SCALE.

SPECIFICATION forming part of Letters Patent No. 495,752, dated April 18, 1893.

Application filed August 9, 1892. Serial No. 442,606. (No model.)

*To all whom it may concern:*

Be it known that I, ROBERT McFARLANE, of Minneapolis, county of Hennepin, State of Minnesota, have invented certain Improvements in Recording-Scales, of which the following is a specification.

This invention relates to improvements in recording scales, and the object of the invention is to provide means for making a permanent record of that portion of the weight of the article or material weighed, that is represented by the removable weights that are suspended upon the beam in balancing the scales.

Other objects of the invention will appear from the following detailed description taken in connection with the accompanying drawings, in which;

Figure 1 is a side elevation of a portion of a scale showing my improvement applied thereto. Fig. 2 is an end view of the same. Fig. 3 is a detailed plan view showing the arrangement of the gearing that operates the rack bar.

In another application of even date herewith, I have described and claimed a recording mechanism that is connected with the slide or sliding poise that is arranged upon the scale beam. In some instances, especially in connection with large scales, such as track scales, it is necessary to provide removable weights which may be connected with the beam in a manner well understood, for the purpose of weighing greater amounts than can be weighed by the use of the sliding poise alone.

My present invention consists in means connected with a scale of this kind for recording the amounts represented by these removable weights.

In the drawings, 2 represents the scale beam which is pivotally supported upon a suitable standard 3, its free end preferably passing through the standard 5 and the platform being connected to the beam in the usual way through the rod 7. This beam is provided with the usual slide or sliding poise 9 and also with the suspended weight or poise holder 11, which is preferably connected to the free end of the beam in the usual manner. Arranged upon the holder 11 and adapted to slide vertically upon its suspended rod 13, is a suitable follower 15 to which is connected a rack bar 17. This rack bar engages a pinion 19 arranged upon the shaft 21, said shaft being journaled in bearings 23 on the side of the beam. The rear end of this shaft is preferably provided with the bevel pinion 25, and this pinion engages the bevel gear 27, mounted upon the shaft 29 also supported upon the beam, and the gear 27 is connected to or formed integrally with the pinion 31, which engages the rack bar 33. The rack bar 33 in turn engages a gear 35 that is connected with the recording wheel 37. This wheel 37 is provided with raised characters which correspond to the weights that may be suspended from the beam upon the holder 11. A sliding standard 39 is arranged beneath the wheel 37 and is connected with the foot treadle 41 by means of a suitable connecting rod, and the spring 43 is connected with this treadle and is arranged to hold the standard normally in its depressed condition so as to hold it away from the wheel 37. The poise or weight holder 11 is adapted to receive any number of weights, and these weights are of different thicknesses, corresponding to the amounts that they represent. As each weight is placed upon the holder 11 beneath the follower 15, said follower is raised, and thereby, through the means described, the recording wheel is turned so as to bring directly over the sliding standard 39 a number corresponding to the amount represented by the weight that has been placed upon the holder. A suitable ticket, a recording strip or other device upon which it is desired to make a record, is then placed or fed between the recording wheel and sliding standard 39. Pressure is then applied to the treadle, the standard is raised and presses the paper or strip against the recording wheel making an impression or record thereon. Any number of weights may be added to the holder, and the total amount represented thereby will be also represented by the recording wheel and may be recorded either upon the recording strip, recording ticket or any other suitable device.

I claim as my invention—

1. The combination with the scale beam and the suspended weight holder, of the follower arranged upon said weight holder, and beneath which the weights may be placed, the recording wheel mounted in bearings independent of said scale beam and holder, and connecting means between said follower and said recording wheel.

2. The combination with the scale beam and weight holder of the follower arranged upon said weight holder, the rack bar connected therewith, the shaft mounted upon said scale beam and provided with pinion engaging said rack bar, the recording wheel mounted independently of said scale beam, and the connecting mechanism between said shaft and said recording wheel, for the purpose specified.

3. The combination with the scale beam and the suspended weight holder, of the follower arranged upon said weight holder and provided with suitable rack bar, the shaft 21 mounted in bearings upon the scale beam and provided with the pinion 19 engaged by said rack bar, and with the pinion 25 engaging the pinion 27, also mounted upon said scale beam, the pinion 31 connected with the pinion 27, the rack bar 33 engaging said pinion 31, the registering wheel 37 provided with the pinion 35 engaged by said rack bar 33, substantially as described.

4. The combination with the scale beam and the suspended weight holder, of the follower arranged upon said weight holder, the recording wheel mounted independently of said scale beam and means for pressing a recording strip or ticket upon said recording wheel and taking an impression therefrom, and means connecting said follower and said recording wheel, whereby said follower is moved by the addition or removal of weights from the weight holder, and said recording wheel is turned to correspond with the movements of said follower, substantially as described.

In testimony whereof I have hereunto set my hand this 4th day of August, 1892.

ROBERT McFARLANE.

In presence of—
A. C. PAUL,
M. E. GOOLEY.